United States Patent [19]
Locke et al.

[11] Patent Number: 6,053,439
[45] Date of Patent: Apr. 25, 2000

[54] REDUCING WAX CONTENT AND ENHANCING QUALITY OF RECYCLED PULP FROM OCC AND WASTE PAPER

[75] Inventors: Ralph E. Locke, Plainfield, Ind.; Gary N. Prentice, Kingwood, Tex.; Christopher M. Vitori, Mason, Ohio

[73] Assignees: Inland Paperboard and Packaging, Inc.; Thermo Black Clawson Inc.

[21] Appl. No.: 08/908,988

[22] Filed: Aug. 8, 1997

Related U.S. Application Data

[60] Provisional application No. 60/032,744, Dec. 16, 1996.

[51] Int. Cl.[7] .............................. B02C 19/12; B02C 23/08
[52] U.S. Cl. ................................ 241/20; 241/21; 241/23; 241/24.19; 241/28; 241/46.17; 241/65; 241/79.1
[58] Field of Search .................................. 241/17, 20, 21, 241/23, 24.19, 28, 46.11, 46.17, 65, 79, 79.1

[56] References Cited

U.S. PATENT DOCUMENTS

| | | | |
|---|---|---|---|
| 3,849,246 | 11/1974 | Raymond et al. | 162/4 |
| 3,849,302 | 11/1974 | Seifert | 209/273 |
| 4,154,644 | 5/1979 | Ericsson | 162/60 |
| 4,725,007 | 2/1988 | Chupka | 241/46.02 |
| 4,975,204 | 12/1990 | Henricson et al. | 210/785 |
| 5,156,750 | 10/1992 | Henricson et al. | 210/783 |
| 5,255,540 | 10/1993 | LeBlanc et al. | 68/181 |
| 5,707,489 | 1/1998 | Von Grumbkow et al. | 162/4 |

OTHER PUBLICATIONS

Chemi–Washer® Horizontal Belt Design Washer, Bulletin No. 66–SBC, pp. 1–8, no date given.

"LIQUI–FILTER™ Pressurized Fiber Filter," Black Clawson Company Bulletin No. MB–331–A, Nov. 1992.

McEwen, John G.E., "OCC Recycling: Improving the Repulpability of Waxed Coated Corrugated Paperboard," TAPPI Pulping Conf. Proc. Book 2, pp. 493–501, Nov. 1–5, 1992.

Jan Bruzelius, "Waxed Corrugated Board is Now Recyclable!" personal press release, Jun. 1, 1994.

McEwen, John G.E. et al., "Improving the Repulpability of Wax Coated Corrugated Paperboard," Jul. 1993, Tappi *Journal* vol. 76, No. 7, pp. 116–121.

Ernst Back, "Wax and Recycling: Problem, What Problem?" *PPI* Oct. 1994, pp. 47, 49.

Galland, Gerard et al., "Recycling of Waxed Papers and Boards" 1996 *TAPPI Recycling Symposium*, pp. 81–89.

Wilken, R. et al., "Wellpappe im Alpapierkreislauf: Bewertungskriteien und erste Erfahrungen" *Papierverarbeitung Und Druk*, Apr. 1994, pp. 632–639.

Horng, A.J. et al., "A Novel Use of the Formette Dynamiques Sheet Former in Paper Recycling Research" *CCPA 3rd Research Forum on Recycling*, pp. 135–139.

(List continued on next page.)

*Primary Examiner*—John M. Husar
*Attorney, Agent, or Firm*—Biebel & French

[57] ABSTRACT

A system and method for treating a waxed fiber paper product with a high wax content to remove a substantial portion of the wax content includes the pulping of the wax paper fiber at an elevated temperature in excess of the melting temperature of the wax to separate a pulp fraction and to form an emulsion of water and molten wax. The pulp fraction is separated from the emulsion by filtering in a reverse pressure screen in which a finely perforated screen defines a high pressure side and a low pressure side, and a major portion of the water/emulsion is removed from the suspension through the screen perforations leading from the high pressure side to the low pressure side, in which a rotor and foil arrangement within the reverse screen is operated under such conditions that the suspension at the high pressure side of the screen is maintained in a constant fluidized condition.

13 Claims, 4 Drawing Sheets

OTHER PUBLICATIONS

Back, Ernst L. et al., "Wax Removal After Alkaline Hot Dispersion on a Pilot Plant Scale. Autodispersible Waxes for Recyclable Packaging Papers. VI." *Progress in Paper Recycling,* Nov. 1995, pp. 91–99.

Tsuruzono, Eiji "Introduction of New Products for Stock Preparation Equipment" *Japan TAPPI Journal #48,* No. 1 Jan. 1994 (English Abstract), pp. 231–235.

"Bird Escher Wyss Centrifilter Pressure Screen" Bulletin CPS100 (no date).

Lowrie, Robert D., "A New Method of Filtering Fiber from Various Internal Mill Process Water Streams" News Release of Bird Escher Wyss (12 pp) Sep. 4, 1989.

Rangamannar, Goda et al., "The Dynamic Washer—A New Approach for Washing Recycled Fibers" TAPPI Notes, *1993 Recycling Symposium,* pp. 247–264 Feb. 28–Mar. 4, 1993.

REDUCING WAX CONTENT AND ENHANCING QUALITY OF RECYCLED PULP FROM OCC AND WASTE PAPER

CROSS-REFERENCE TO RELATED APPLICATION

Benefit of the co-pending U.S. Provisional Application entitled "REDUCING WAX CONTENT AND ENHANCING QUALITY OF RECYCLED PULP FROM OCC AND WASTE PAPER," Ser. No. 60/032,744 filed Dec. 16, 1996, Attorney Docket BKS 274 P2-USP is claimed.

BACKGROUND OF THE INVENTION

This invention relates to the recycling of petroleum-based wax coated or impregnated waste paper and more particularly to the recycling of old corrugated cartons (OCC) which have been impregnated or coated with conventional petroleum-based wax.

Wax saturated and wax coated cartons are particularly useful for shipping and storing food and produce, such as iced fresh produce, seafood, poultry and refrigerated meats. It is also useful as industrial packaging where a product is exposed to water and/or very high humidities and to packaging which require high stacking strengths and stiffness under dry conditions.

The waxes which are most commonly used comply with U.S. Federal Drug Administration requirements and regulations for use as an indirect food additive and as a component of paperboard in contact with food products. Saturating waxes have also been approved by the United States Department of Agriculture (USDA) for use in packaging of meat, fish, and poultry under federal inspection, and are approved for packaging materials which come into direct contact with such poultry or food products. Such waxes are relatively easy to deploy since application temperatures run in the range of about 190–210° F., depending on the particular wax grade and the product, and have relatively low melting points in the range of about 125–140°, depending upon the wax formulation.

The same moisture resistant characteristic of such carton material has formed an impediment to satisfactory use of repulped petroleum-based waxed paper products. Wax corrugated material or board packaging material is not generally considered to be an accepted source of secondary fiber. Small undispersed particles of wax can form dark spots on a sheet, often referred to as a wax spot, thereby providing an undesirable blemish. More importantly, only a small percentage of wax mixed within the cellulose fibers drastically reduces both the strength and the dry coefficient of friction, measured as a slide angle, of the finished carton product. A small percentage of residual wax in the furnish can reduce the coefficient of friction and the slide angle to the point where the resulting carton material is not acceptable. Existing OCC reclaiming systems, in most up-to-date paper and pulp mills, are state-of-the-art systems and function well on a furnish of traditional OCC. The introduction of varying amounts of wax material into such existing systems tends to upset that process, and contaminates the entire system.

Also, a small amount of wax saturated OCC by volume or by weight, can add a significant amount of wax to mixed OCC and to a recycled paperboard furnish. Therefore, it is often necessary, in recycling, manually or by other means to separate out the heavily waxed cartons, to prevent an overloading of wax in the furnish. The principal obstacles to recycling waxed OCC is the resulting low paper-to-paper friction for packaging papers, the negative effect on strength, and generally reduced quality of the recycled product. Although cascade coated wax board products are beneficial and provide desirable moisture barrier and food compatible qualities at low costs, nevertheless this product carries with it the stigma that it is not considered to be recyclable, using presently known techniques.

While petroleum wax coated or impregnated OCC represents approximately 5% of the U.S. production of corrugated carton material, only a small portion of this can be recycled and reclaimed, and then must be mixed with a very substantial portion of unwaxed OCC. Considerable efforts have been expended to improve the recyclability of petroleum waxed packaging products and improve the related processes. A major stumbling block has been the finding by leading researchers that waxed paper was not repulpable in a conventional hydra pulper. McEwen and Wang "OCC Recycling: Improving The Repulpability Of Wax Coated Corrugated Paperboard" Tappi 1992 Pulping Conference Book 2, Nov. 1–15, 1992, pages 493–502 concluded that waxed corrugated carton is not an acceptable source of secondary fiber and that commercially available carton coatings (wax) are considered non-repulpable. In repulpability tests, the pulper was operated at a temperature below the melting point of the wax, for the purpose of allowing the wax to remain in pieces, for subsequent screening and cleaning. When the temperature in the pulper was raised from 49° C. to 68° C., close to the wax melting point, the paper became defibered but most of the wax softened and deposited on the pulper surface, an unsatisfactory result. McEwen and Wang went on then to test the effect of adding chemicals to the wax prior to the wax being applied for the purpose of promoting the release of the wax component, in repulping, of the paper fibers from the wax in order to maintain pulping temperatures far below the wax melting point.

Back and Jousimaa, "Wax Removal After Alkaline Hot Dispersion On A Pilot Plant Scale, Autodispersible Waxes For Recyclable Packaging Of Papers," Progress in Paper Recycling, November 1955, pages 91–99, describe the results of using a wax coating which has been previously specially modified with fatty acids to facilitate subsequent removal from OCC. Pulping was accomplished in a chest at a temperature well below the congealing temperature of the wax, and hot dispersion was accomplished in a separate disk refiner at a pH of about 11.0 with wax removal taking place in one or more dewatering screws. Removal of such pretreated wax using a low pitch screw press was observed as high as 90%. No data is given on the removal of unmodified petroleum waxes.

Galland, Vernac, and Brun, "Recycling Of Wax Papers & Boards," Tappi, Mar. 5–7, 1996, Tappi Recycling Symposium, pages 81–89 describes experimental efforts to remove conventional untreated wax from OCC. The wax coated paper was repulped at low temperature to avoid deposition of wax in the pulper pipes and chests. Subsequently, wax dispersion was accomplished in a separate kneader, and conventional screening was attempted to remove the wax. After two screening passes the total efficiency did not exceed 86%, and the 2½% residual wax was considered as rendering the combination inefficient. Flotation using deinking flotation cells provided a higher efficiency of nearly 95%. Flotation appeared to be the most appropriate technique to remove wax although the flotation cell induced an additional loss of 15 to 20% of the pulp. This reject rate appeared to the authors to be too high for papermakers to economically produce corrugated paper.

There accordingly exists a long felt need to provide a method and system by which unmodified wax content of waxed OCC or by which an excessive was content of a furnish may be efficiently and effectively removed or reduced, without wax buildup in the tanks and pipes, without unacceptable degradation of the pulp, with acceptable losses, to produce a dewaxed paper pulp having a wax content of 1% or less. There is likewise a need for an efficient process for pretreating a waxed furnish so that it may be introduced without detriment into an existing OCC system.

SUMMARY OF THE INVENTION

The invention is directed to a new an unobvious method and apparatus for removing wax from OCC and wax coated paper materials in which unmodified or conventional petroleum-based waxes are removed to a percentage of 1% or less in the resulting furnish using relatively low cost, conventional paper pulp defibering and washing equipment.

Corrugated carton material may contain varying percentages of petroleum wax depending on the manner in which the wax has been added to the product. Generally, and commonly, the wax is applied by cascade applicators, by curtain coaters, or by dipping, in which the material of the carton is effectively submerged in the molten wax product. Typically, wax pickups by the untreated carton material may be as high as 45–50% or more by weight of the untreated material. Such material after treatment is considered to be saturated by the liquid wax.

In the practice of the invention to disassociate and remove petroleum wax from waxboard or packaging materials (waxed OCC) the separate wax dispersion step, as practiced or attempted in prior art arrangements, identified above, is eliminated. This has the advantage of reducing the complexity of the system and correspondingly lowering the cost.

The waxed OCC is pulped in a paper stock pulping machine including a bottom or side extraction bed plate and a driven impeller at the bed plate. A Hydrapulper® equipped with a Mid-Con screw flight mounted on the impeller as shown in U.S. Pat. No. 4,725,007 may be used, as supplied by Thermo Black Clawson, Inc., 605 Clark Street, Middletown, Ohio 45042 (hereinafter "Black Clawson"). The Hydrapulper® machine both defibers the old carton material and disperses the wax content. Once the furnish has been defibered and the wax content dispersed at an elevated temperature in the Hydrapulper® machine, the defibered material is subject to the usual treatments of OCC fiber reclaiming including trash removal, course and fine screening, followed then by separation of the dispersed wax and water emulsion from the fibers.

An important characteristic of the system is that all process steps from pulping through wax separation are carried out at a temperature above the melting temperature of the wax. All "cold" surfaces are eliminated, such as by preheating, and maintained at a temperature so that, at each stage, the fluid and all flow conduits, tanks and pressure vessels are maintained at a working temperature that exceeds the wax melting temperature, with the result that there is no tendency for wax to build up on walls of tanks, on pipes or in valves, thus permitting all system components to operate efficiently.

The system may be batch operated or operated continuously. When batch operated, all parts should be preheated with hot water and/or steam.

High efficiency pressure washing apparatus is used for separating the good fibers from the heated wax and water emulsion. This is accomplished by subjecting the suspension to thickening and separation pressure vessels, namely, high speed rotating reverse pressure screens as sold by Black Clawson. The reverse pressure screen contains a screen cylinder with a micro-perforated or micro-slotted electron beam or laser beam drilled openings. Each of such reverse screens removes wax substantially in accordance with its hydraulic split characteristic of about 90/10. The stock is provided at the inlet at relatively low consistency, and a 90/10 split means that about 90% of the liquid content is removed in the screening apparatus. Thus, if the inlet consistency is 0.5%, the thickened pulp will have a theoretical consistency of 5%, and 90% of the wax/liquid content would have been removed.

With a high wax content furnish, a plurality of such screens, such as two or three or as many as required to produce the desired result, may be connected in series or tandem relation and connected to have a counter current flow of cleaning liquid or filtrate from the last screen to the first. The freshest or cleanest liquid is applied to the last of the plurality of screens, and the liquid taken from the last screen is delivered to the inlet of the immediately preceding screen for stock dilution, and so forth back to the first of the screens. In this manner, a dispersed and emulsified wax content is effectively removed in the repeated thickening process through the screen perforations or slots and, at the same time, undesirable fines and water are removed along with the wax component. A certain amount of fines removal is beneficial, as fines generally do not have good papermaking qualities. An enhanced board furnish may thus be provided which has a substantially reduced residual wax content such as about 1% or less, and in any case less than the wax content now found in conventionally processed OCC with random and naturally occurring wax samples mixed in.

The pressure screen used with this invention has been referred to as a "reverse" pressure cleaner because the "accepts" are collected at the inlet or high pressure side of the screen and the rejects are collected at the opposite or low pressure side of the screen. A drum-type rotor is positioned adjacent to the screen inlet surface. The rotor has on its surface impulse devices in the form of airfoil-shaped protuberances, known as "foils" and is rotated to maintain the fiber at the inlet surface of the screen in a continuously fluidized state, so that a fiber mat is prevented from forming on and blocking the screen inlet surface. The screen openings are of such dimensions that the heated wax emulsion is effectively separated from the fibers without blocking of the openings, since the heated wax emulsion freely flows through the small screen openings to the low pressure side of the screen.

A certain amount of fines are also removed along with wax. The fines generally do not have good paper making qualities and tend to reduce the strength of the product. The enhanced furnish which is thus supplied has predominantly long fibers, and is essentially free of wax, i.e., about 1% or less and as low as $3/10$ of 1% or less using a plurality serially connected reverse screens. The wax from the wastewater may be recovered in a clarifier by dissolved air flotation, and a particularly useful equipment for this purpose is the D-A-F "Supercell" manufactured by Krofta Engineering Corp., Lennox, Mass. 01240. Thereafter, the wax laden sludge may be used as a source of fuel or other wax by product uses.

In another aspect of the invention, a reverse pressure screen is used in the method to reduce the wax content of conventionally repulped OCC. In this aspect, the process may be considered as "polishing" a paper pulp furnish which has an undesirable or unacceptably high wax content in excess of 1%. When it is considered that slide angle, in all grades of paperboard and paper carton material, is a significant problem, even a wax content as low as 2%, for example, may be undesirable. Since wax contents in this range seem to be pervasive, and tend to be recycled more than once, auxiliary means have been employed to increase the slip angle, such as by spraying the surface of the carton or board material with colloidal silica to increase its coefficient of friction. In some instances, further increase of the slip angle by more thorough reduction of wax content would permit the elimination of auxiliary treatments and systems for the purpose of increasing the friction between sheets of paper board material. Under these circumstances, and following the teachings of this invention, even a single reverse pressure screen, with a hydraulic split of 10:1, has the capability of reducing such wax content by about 90%.

It is accordingly an important object of this invention to provide a method and apparatus by which petroleum or petroleum-based wax may be effectively removed from waxed OCC cartons or similar sources of paper fiber, for recycling such fiber and for providing a usable board furnish with a minimum wax content, and with a minimum decrease in friction characteristics of paperboard made from such stock.

A further important object of the invention is the provision of a method, as outlined above, by which a petroleum wax constituent is separated from paper fibers in a hydrapulper at elevated temperature, and in which the wax laden liquid fraction is removed by screening in high pressure "reverse" screens having very small apertures or openings and in which the stock suspension is maintained in a fluidized condition with the wax and waste liquid component passing through the screen openings leaving a thickened and substantially de-waxed furnish.

A still further object of the invention is the provision of a method, as outlined above, in which a plurality of such screens are arranged in serial or tandem fashion with counter current wastewater connections, in which the cleanest water is applied for dilution at the last of such screens and the wastewater from such screen is applied to the immediately proceeding screen as dilution water, etc.

A still further object of the invention is the provision of a method in which waxed OCC material is pulped in a pulper at relatively high consistency and under elevated conditions of temperature and alkalinity, in which the resulting pulp is screened through conventional course and fine screenings, and in which the screened product having a dispersed wax emulsion is applied at low consistency serially to the inlets of revolving reverse pressure screens, in which the pulp component is maintained in a fluidized condition under pressure and in which a major portion of the liquid component is extracted through fine openings or slots in the screen, with a liquid wax component, along with a certain amount of fines and ash. It is preferably to employ a plurality of such pressure screens connected in serial arrangement with counter current flow of dilution liquid.

Another object of the invention is the provision of a method, as outlined above, in which one or more reverse pressure screens are employed and operated to "polish" an existing recycled suspension of paper pulp, for making a further significant reduction in the wax content of such pulp.

Other objects and advantages of the invention will be apparent from the following description, the accompanying drawings and the appended claims.

BRIEF DESCRIPTION OF THE DRAWINGS

FIG. 1 is a system diagram of a preferred arrangement of components in which

DETAILED DESCRIPTION OF THE PREFERRED EMBODIMENT

Figure 1A:
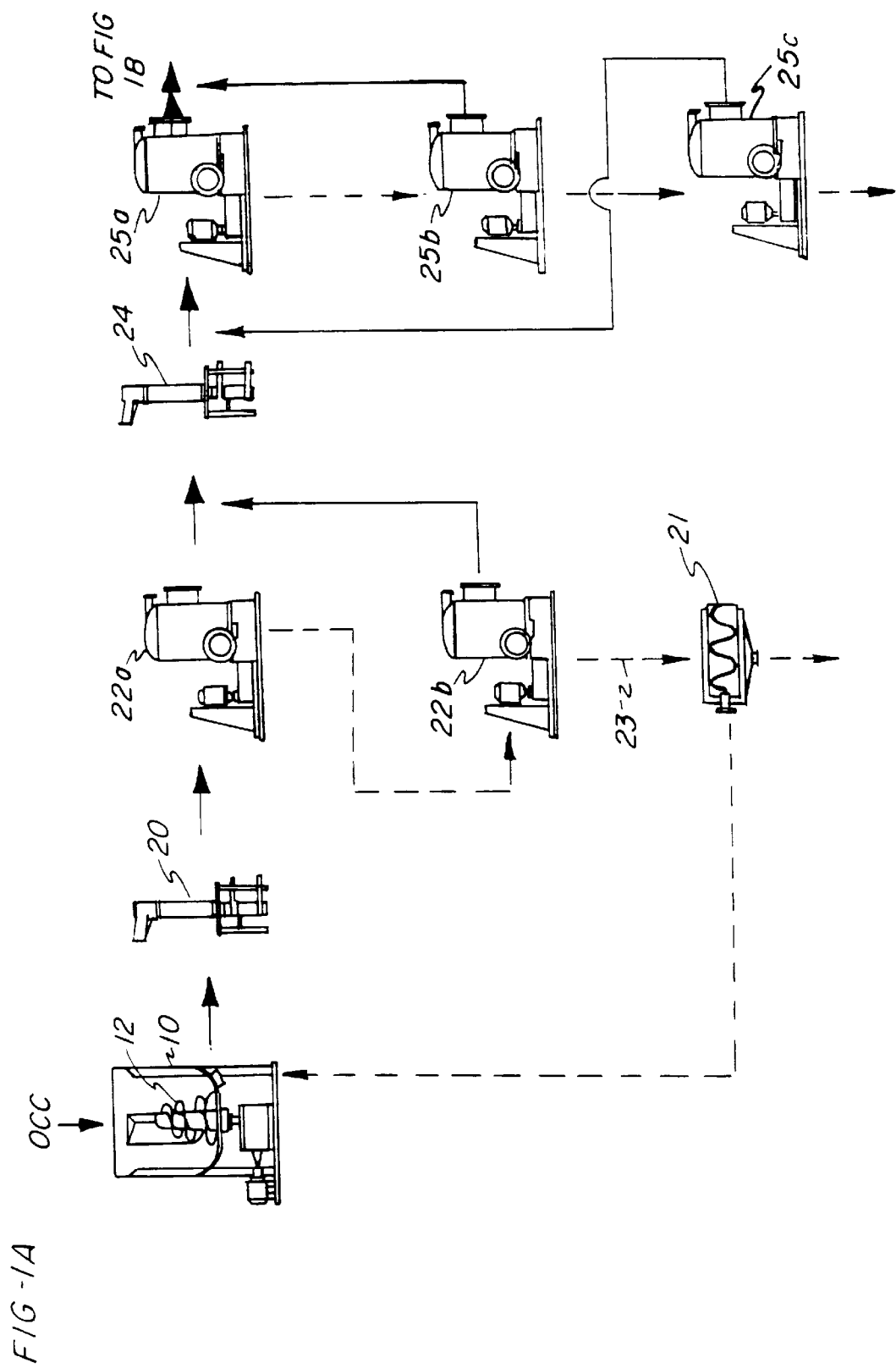
FIG. 1A shows the first steps in the process and FIG. 1B shows the final screening steps in the process.
Figure 1B:
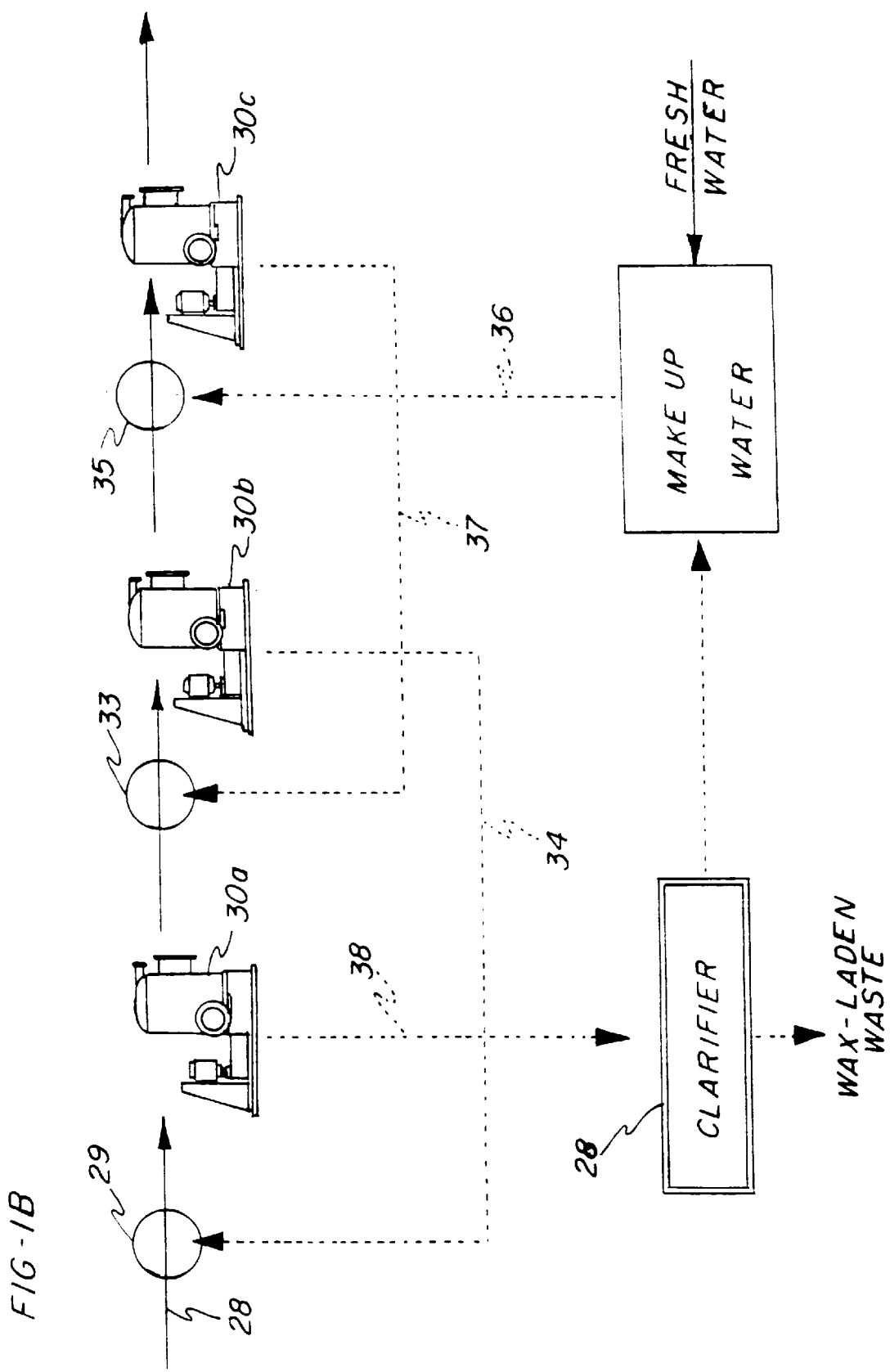

FIGS. 1A and 1B represent the steps and the preferred apparatus used in performing a method of this invention. Beginning with the waxed OCC, it is applied to a high consistency stock pulper represented generally at 10 with an impeller which operates over a perforated bed plate for extraction of pulped material from the pulper 10. The pulper may be a Hydrapulper® and shown in U.S. Pat. No. 3,339,851 issued Sep. 5, 1967 and made by Black Clawson, previously identified. Preferably, the stock pulper is equipped with a Black Clawson MidCon screw 12 mounted on the impeller as shown in U.S. Pat. No. 4,725,007 issued Feb. 16, 1988. Such a configured pulper is particularly useful in defibering difficult furnishes such as those with a high wax content.

Before pulping, all components in the system including the pulper 10 are heat preconditioned by being brought up to an operating temperature in excess of the melting point of the petroleum based wax. The systems operating temperature should be in excess of the wax melting temperature so that in instances where the wax melts at 120°, the system components should be preheated and conditioned to about 130° F. or higher. This preconditioning is accomplished by running steam heated water through all of the conduits, valves, and apparatus to illuminate any cold walls or surfaces onto which wax may congeal.

Following such preconditioning, the wax laden waste board and waste paper and old corrugated cartons, generically referred to here as "OCC", is added to the tank of the pulper 10 and heated water is added to provide a medium pulping consistency in the range of approximately 8 to 12%. In defibering this material, it has been found helpful to elevate the pH to a range of about 8.5 to 12, by adding sodium hydroxide or other pH elevating agents. The higher pH has the beneficial effect of promoting defibering of the components by assisting in breaking down difficult to defiber furnishes and preserving fiber strength. The swelling of the fiber under the influence of the alkaline conditions promotes separation of wax from the fiber and reduces fiber loss through the reverse pressure screens.

The amount and extent of defibering can be monitored visually or by taking a grab sample and observing the results. The observation to determine the extent of defibering is no different from that which is made in the repulping of conventional OCC or mixed office wastes. The elevated temperature is maintained throughout.

The pulper not only defibers the pulp but disperses the wax in liquid form throughout the mass and throughout the about 88 to 92% water content as an emulsion of liquid wax and water. At the elevated temperature, there is no tendency for wax to build up on the pulper tank walls or on the rotor.

OCC, as well as other waxed papers, commonly contaminated with or accompanied with lightweight contaminants as well as heavy debris, which may be entrained with the wastepaper into the tank of the pulper. It is common to provide an auxiliary system for the purpose of relieving the pulper tank of such lightweight and heavyweight crude contaminants before they can be broken down by the impeller to sizes which are sufficiently small so as to pass through the holes of the extraction bed plate in the pulper. For this purpose, the pulper 10 may be equipped with a trash purging system such as the Hydrapurge detrashing system of Black Clawson. Such a detrashing system operates on a cycle basis and extracts stock directly from the pulper tub for a period of time where the fiber is accepted through a perforated bed plate and plastics and other lightweight debris build up inside where they are periodically purged to a dewatering drum. If such equipment is installed with the pulper, it is similarly important to assure that the operating components of the detrashing system are also brought up to or substantially to the previously defined system operating temperature.

The defibered pulp suspension including the wax emulsion is then subjected to conventional waste paper cleaning steps which are diagrammed on FIG. 1A. The particular steps and processes which are used to remove course undefibered clumps, heavy as well as lightweight contaminants and "stickies" including cyclone and screen cleaning steps, are not critical to the performance of this invention or the practice of the method, provided that all of the steps are performed at the previously-defined elevated temperature.

FIG. 1A shows the output of the Hydrapulper® being applied to a high consistency free vortex cyclone separator 20. The cyclone separator 20 may be a Ruffclone separator having a top tangential inlet and accepts outlet, with a bottom rejects outlet for heavy contaminants, as made by Black Clawson.

The accepts from the cyclone 20 is applied to one or more coarse screen separators designated at 22a and 22b. These are power driven paper pulp screening machines incorporating a generally cylindrical screen and having an internal rotating impeller. The screens 22 remove from the stock coarse contaminants which may be delivered on reject lines 23 to a reject sorter, while the screened accepts are directed to a medium consistency cleaning cyclone separator 24. The cyclone separator 24 is of the same general construction as the cyclone 20 and may be a Liquid Cyclone as sold by Black Clawson. The purpose of the medium consistency cyclone 24 is to remove lighter weight contaminants and "stickies". It is understood that the rejects from each of the cyclones 20 and 24 are conventionally processed and may also be sent to a reject sorter 21 as illustrated in FIG. 1A along with the rejects from the screens 22a and 22b. The reject sorter may be a Black Clawson ULTRASORTER reject processor which is a non-vibrating low attrition totally enclosed tailing screen that removes debris normally found in a coarse screening loop. After screening, the affluent may be returned to the pulper and the sorted rejects dumped to waste or landfill.

The pulp is then conventionally processed with one or more fine pulp screens 25 which may be identical to the coarse screens 22 with the exception of the fact that the screening cylinder or screening basket is formed with finer perforations or slots. In the screens 25 as represented by a primary screen 25a, a secondary screen 25b and an optional tertiary screen 25c remove the smaller contaminants. In the setup as shown, the affluent reject from the first fine screen 25a is diluted and applied to the second fine screen 25b. If a further screening is required, this affluent from the screen 25b may be applied to the tertiary screen 25c. In the case of screens 25a and 25b, the accepts outlet will usually be joined for further processing while the accepts outlet of the tertiary screen may usually be re-applied as an input to the first screen 25a, while the final reject, from the last of the screens, may be sent to a rejects sorter.

Up to this point, there has been no specific effort to remove the wax emulsion component or fraction from the pulp fraction of the furnish although a small part of the wax is inherently removed in the pulp washing and screening operations of FIG. 1A. The remaining wax emulsion fraction is removed in the reverse pressure screen stages represented in FIG. 1B and diagramed in FIG. 2.

Figure 3:
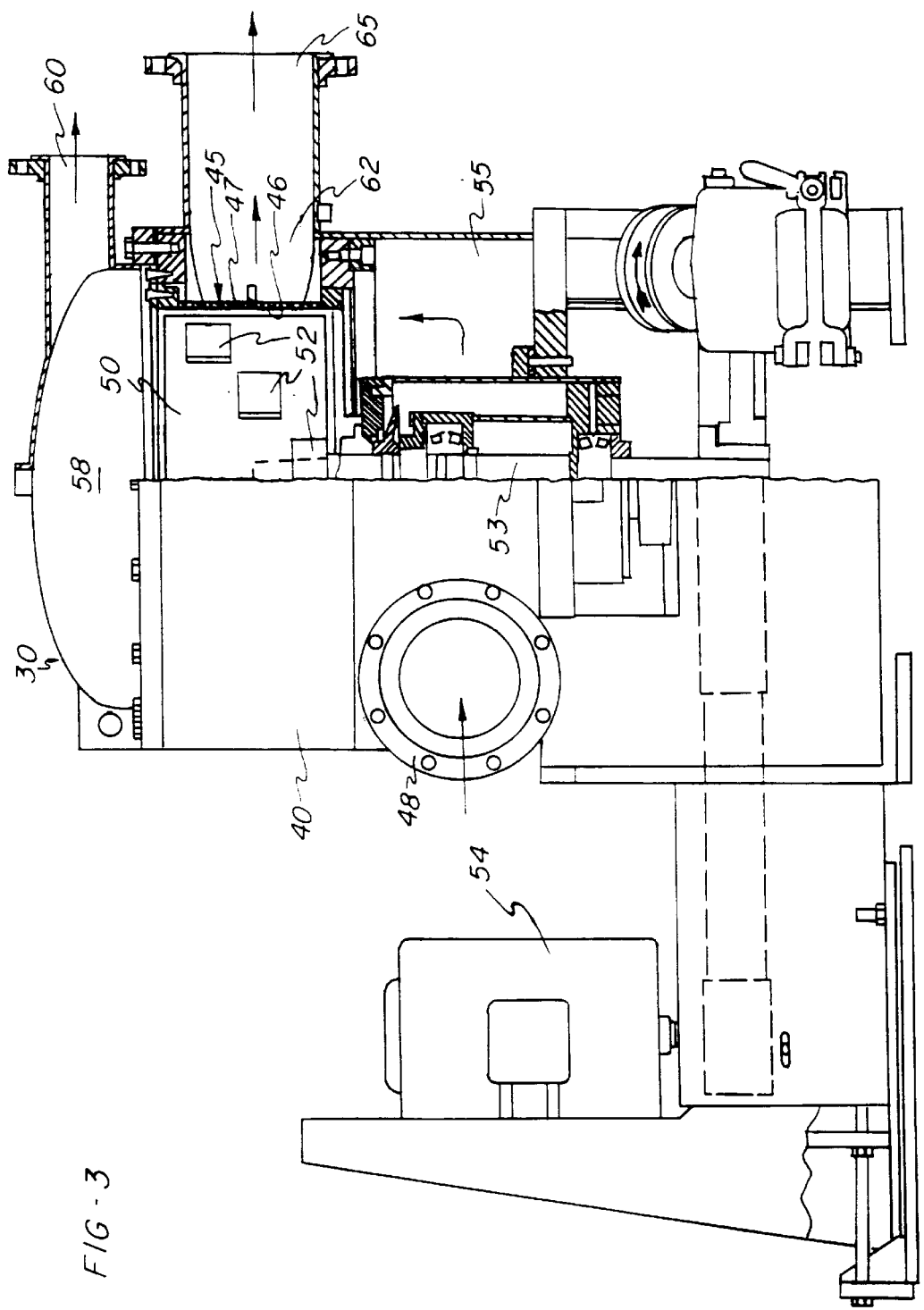
FIG. 3 is a partial sectional view of a reverse pressure screen as used in the practice of this invention.

The pulped inlet furnish on line 28 is diluted by heated process water or heated fresh water to a relatively low consistency of about 1% or less through a conventional consistency controller 29 and is applied to the inlet of a high speed "reverse" pressure screen 30, comprising preferably one of three cascade connected identical, such pressure screens as shown in FIG. 3 with countercurrent washing, and described in greater detail below.

The reverse pressure screen 30 closely resembles a conventional screen cylinder such as shown in U.S. Pat. No. 3,849,302 with a stationary cylindrical screen having an inner inlet high pressure surface and an outer outlet low pressure surface. Preferably a drum-type rotor is used with foils on its outer surface and within the interior of the screen adjacent the inlet or high pressure side of the screen. The principal difference between a conventional cylinder screen and a "reverse" screen cylinder is the fact that the openings of the reverse screen cylinder, as used in this invention, are much smaller than those of a conventional screen and act as a filter to prevent a major portion of the pulp from passing through. Preferably, the openings consist of electron beam drilled holes which may be as small as about 0.004", or smaller, but good results can be obtained with a cylindrical hole in the range of 0.006" to 0.016" diameter. Relatively high rotor speeds are employed such as about 5,000 feet per minute or higher at the inner inlet screen surface to maintain a fully fluidized condition of the pulp suspension at the screen inlet surface.

The stock and wax laden water emulsion are applied to the screen at the relatively low consistency as identified above, to the inner inlet side of the screen and is maintained in a constant fluidized condition to prevent a mat from forming on the screen surface. This fluidized condition is maintained by influence of the foils on the drum surface which move adjacent to the high pressure or inlet surface of the screen. The furnish is maintained at least at the previously defined elevated temperature, and the wax emulsion and water along with fine fiber particles are extracted through the small screen openings into the low pressure or outlet side of the screen. The thickened pulp is removed through an outlet. Thus, the screen may be considered as having a hydraulic split, such as 90/10, in which 90% of the mass entering is extracted from the high pressure side of the screen through the holes and 10%, the thickened pulp, is extracted through the screen outlet. Such a 90/10 hydraulic split by definition results in an increase in consistency by one decimal point so that if the inlet consistency is 0.5%, the outlet consistency will be 5%.

Figure 2:
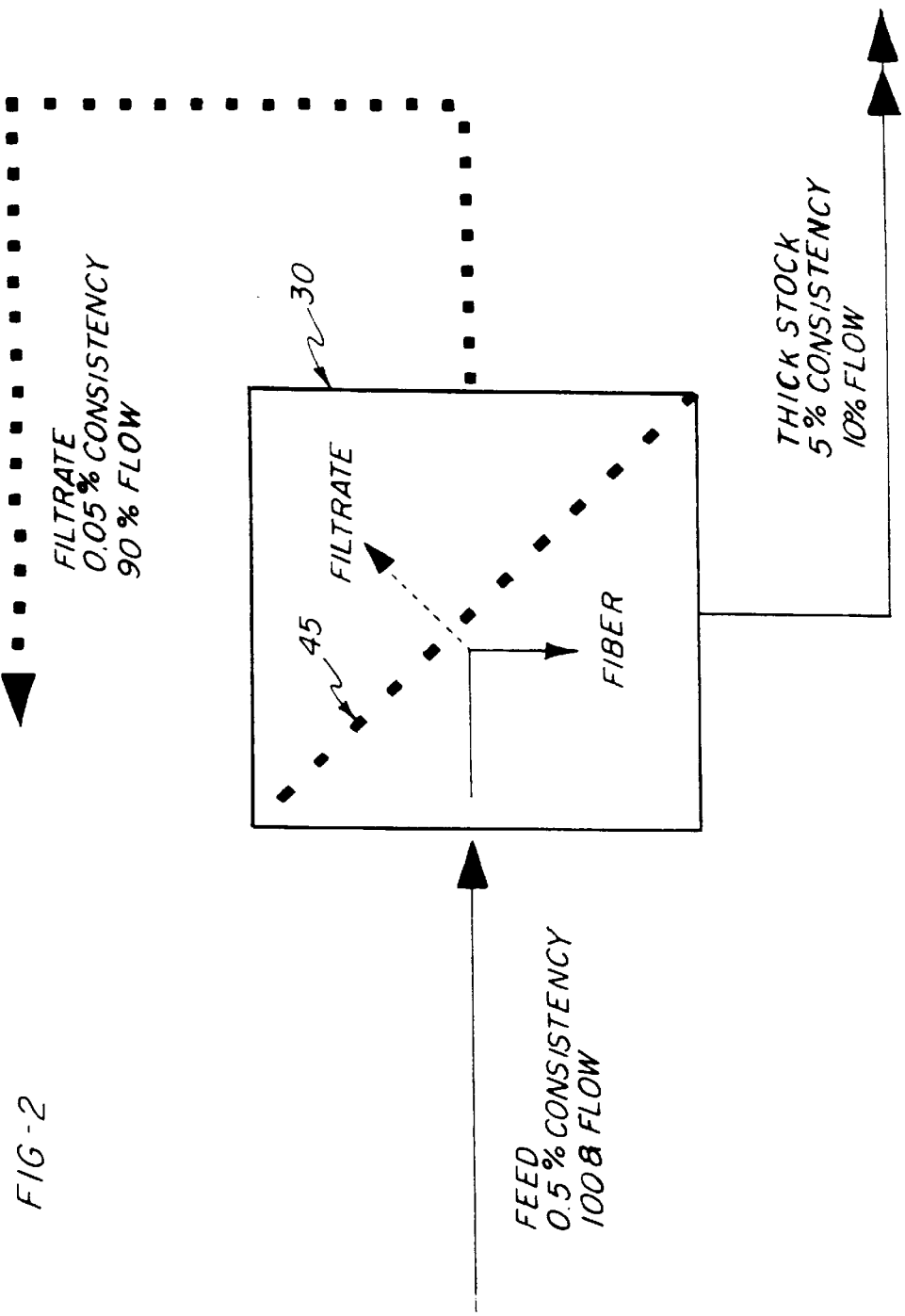
FIG. 2 is a diagrammatic illustration of the removal of the water and wax emulsion in one of the stages of the fine reverse pressure screens.

The heated wax emulsion component, along with ash and some fines, are extracted together through the cylinder holes as "filtrate" in FIG. 2 and good fibers are retained as "fiber" in FIG. 2. If the wax component of the diluted suspension at the inlet represented 10% of the mass, following screening with theoretically clean dilution water, the resultant thickened suspension, i.e., "fiber" in FIG. 2 would have only 1% wax content. Due to the use of countercurrent washing, such theoretical efficiencies cannot be obtained but three washing stages, in tandem, are effective to remove the residual wax content to 1% or less of the thickened stock suspension and preferably less than 0.5% of the suspension by weight.

Thus, in this manner, the thickened and washed stock suspension may be rediluted at a second consistency controller 33 and applied to a second tandem connected "reverse" screen 30b, and the process is repeated. The filtrate from the screen 30b is removed on line 34 and supplied to the controller 29 as dilution water for the screen 30a.

If further washing is desired, the thickened and washed stock from the outlet of the screen 30b may be applied to a tertiary screen 30c after being diluted at a consistency controller 35, as previously described, using makeup water, and water from the clarifier 28 on line 36. The filtrate from the screen 30c is sent on line 37 for dilution at the input to screen 30b in a conventional countercurrent manner. The heavily wax laden affluent from the reverse screen 30A as the filtrate through the screen 45 is delivered by a line 38 to the clarifier 28 and is itself of relatively low consistency, while the thickened relatively high consistency fiber stock is delivered on line 38 for utilization or drying and storage, as the case may be.

The countercurrent washing system in which the cleanest water is applied for dilution to the last cleaning stage, is most efficient for multiple stage washing from a conservation of water standpoint. The amount of fines that are removed depends to some extent upon the nature of the material which made up the furnish to begin with. Since fines generally do not have good papermaking qualities, the removal of some fines with the wax fraction is not considered to be undesirable.

The clarifier 28, as previously described, may be a D-A-F Supercell dissolved air flotation unit as manufactured by Krofta Engineering Corp., previously defined, or other suitable apparatus by means of which the wax component is removed from the affluent. This equipment is operated below the melting temperature of the wax to take advantage of the congealing of the wax and its relatively lighter weight as compared to water. The reverse pressure screens 30, however, are operated at all times with the stock suspension above the melting temperature of the wax so that the wax passes through the screen openings as a liquid.

As previously noted, the hole sizes in the cylindrical screen, in a practical range, would be from about 0.004" or less to about 0.016" in diameter with preferred ranges between about 0.006" and 0.010" in diameter. In such screens, the open area ranges from about 10% to about 15%. Holes are preferred to slots, but a slotted screen could be used.

The reverse pressure screen 30 is illustrated in partially cut-away view in FIG. 3 as having an outer housing 40 forming a pressure vessel. The housing 40 contains a stationary non-rotating screen cylinder 45 therein. The screen cylinder has an inner inlet or upstream surface 46 and an outer outlet or downstream surface 47 and is provided with a plurality of closely spaced perforations or slots of a dimension, as previously described. A rotating foil support member is positioned closely adjacent the inner inlet surface, and in the instance of the preferred embodiment, as shown in FIG. 3, the foil member is in the form of a rotating drum 50 shown in partial elevation having foils 52 formed on the outer surface which foils rotate in close proximity to the inner filtering or inlet surface of the screen cylinder 45. Typically, the foils may be 2" high, 2" wide and ¼"–³⁄₁₆" thick at the point of maximum thickness. The drum is mounted for rotation by a drive shaft 53 and a drive motor 54 at a rate of about 5000 ft./minute or more surface speed.

The spacing between the foils and the screen cylinder is maintained at a minimum so that, as the drum is rotated and driven by the motor 54, the stock suspension at the inlet surface 46 is maintained in fluidized condition. Thus, the spacing between the foils and the inside surface 46 of the cylinder may be as little as ¹⁄₁₆ of an inch, and the outer surface of the drum in regions between the foils 52 may be spaced from the inside screen surface less than ½ an inch and in some instances less than ³⁄₁₆ of an inch.

The heated stock suspension and the liquid wax emulsion is brought in, under pressure, to the inlet 48 and is delivered to an interior chamber 55 and from there into the annular space between the outer surface of the drum 50 and the inside surface of the cylinder-shaped screen 45. There is thus created a substantial pressure differential between the inside (upstream) and the outside (downstream) surfaces of the screen, which differential is controlled by controlling inlet and outlet valves and, using these valves, the rate of flow through the reverse screen may also be controlled. Thus, in typical conditions, the inlet pressure may be in the range of about 30–50 psi or even higher.

The thickened fiber, now with a major part of the free liquid and liquid wax component removed is collected in the dome 58 and exits the reverse pressure screen at the accepts outlet 60, while the separated heated water and emulsion is collected in an annular chamber 62 which surrounds the cylinder 45 and deliver to the outlet 65. In such a reverse pressure screen, with a screen basket approximately 43" high and 48" in diameter, 500 gallons per minute of filtrate flow can be processed through a screen having perforated hole diameters of 0.006" and openness of between about 10–15%. This provides a thickened stock accepts capacity of between about 6–20 tons (dry) per 24 hour day.

The preferred inlet consistency is about 0.5% or less, and a maximum inlet consistency, for most efficient operation of the reverse screen is about 1%. The thickened stock would have a maximum of about 6% consistency to be flowable but dilution water may be added in the dome 58 to make the thickened stock more readily flowable from the accepts side. Under these operating conditions, an inlet pressure from the consistency controller 29, 33 or 35 may be between 30 to 40 psi. The inlet pressure differential from feed to the accepts output 60 ranges from about 2 psi to 15 psi with 4 to 8 psi differential as the normal operating range.

With any given screen and given foil speed, the stock inlet and rejects outlet pressure may be controlled by valves in these lines to control the throughput of the screen and to prevent a fiber mat from forming, which could cause a sudden blockage of the screen holes or slots.

For those instances where it is desired to "polish" an existing recycled pulp which may have or contain an unacceptably high wax content after having been processed by conventional OCC reclaiming procedures, a stock furnish may be diluted with heated water to bring the entire furnish above the melting point of its wax content, in the manner previously described, and applied to a pre-heated reverse pressure screen system for screening, preferably at an inlet consistency of about 1% or less, although higher consistencies may be used with somewhat lower efficiencies. The pressure screen is operated in the manner previously described, that is, the input energy to the rotor or to the rotating foils, taken with the through feed rate is more than sufficient to maintain a stock furnish in a fully fluidized condition at the inlet side of the screen. The emulsified and molten wax component will be removed concurrently with the excess water through the screen and the thickened pulp will be ejected through the accepts outlet, as previously described in connection with the description of the operation of the pressure screen 30. Thus, this aspect of the method of this invention, at low cost, permits the beneficiation of the output from conventional OCC processing systems.

Laboratory tests were run for the purpose of evaluating the efficiency of wax removal from wax coated board material using the process and equipment of this invention.

Two pulper batches were prepared. Both batches were run identically from pulping to fine screening. The first pulper batch was made to generate filtrate for dilution for the second batch to simulate the conditions of a commercial installation, with the thick stock from the first run being discarded. The filtrate was diluted to a 6:1 ratio of water to filtrate in the second run for dilution of pulping, and course and fine screening.

Both pulper batches were made with about 1100 lb. of wax coated board material added to 1000 gallons of 150° F. water (or filtrate) to obtain a pulping consistency of 10%. The hydrapulper was configured as previously described and the rotor was run at 290 rpm for 45 minutes on each batch. The temperatures were maintained to 150 degrees and 3.6 pounds of NaOH was added to each pulper batch to increase pH to 9.5. The pulper batches were extracted through ⅜" bed plate holes and pumped over to a screen supply tank. Both batch consistencies in the screen tank were adjusted to 2.5% to feed course screens 22.

Thermo Black Clawson model 100 Ultra-V Pressure Screen is used a Black Clawson UP cylinder with 0.062" holes and a Black Clawson NS-II rotor running at 650 rpm. Accepts were collected in a holding tank and rejected material was recirculated back into the screen supply tank. The screen supply tank was emptied and the accepted material was then pumped back into the screen supply tank and the consistency adjusted to 1.5% for fine screening. The hydraulic reject rate was maintained to 15% on all runs.

Fine screening by the screen 25 for both batches used a Black Clawson PSP cylinder 25 with 0.010" slots and a Black Clawson LP-1 rotor running at 780 rpm. The holding tank received the accepted material and the rejects were recirculated back into the screen supply tank. The accepted material again was pumped back into the screen supply tank and consistency adjusted to 0.5% for reverse screening as in the case of the course screening.

Reverse screening was accomplished on all runs with a reverse pressure cleaner 30 configured as described above using a cylinder with 0.006" holes and a 24" diameter rotor running at 900 rpm. The drive motor was rated at 100 hp and the consumed power measured between 35–38 hp. The unit was fed at approximately 500 gallons per minute for all runs and hydraulic splits were maintained to 10% (10-1). The first pulper batch run retained only the filtrate and the thick stock was sent to a second holding tank. Some of the filtrate was sent to the cleaner tank to hold for later dilution while the remainder was diluted to a 6:1 ratio of water to filtrate and used as dilution for the second pulper run pulper, course screen and fine screen.

In the second run, the reverse screen 30 was run in four separate stages. The first stage used filtrate as dilution from the second holding tank that was diluted to 10:1 to adjust the feed consistency to 0.5%. The thick stock was collected in a dump tank and the filtrate collected in the first holding tank. The filtrate from this run was mixed with water to achieve a 10:1 ratio to dilute the thick stock for stage two reverse cleaner feed at 0.5%. Stage two was run in the same manner as stage one with the filtrate again diluted to 10:1 and used to dilute the thick stock to 0.5% for the third stage feed. The third stage dumped the filtrate to sewer and collected the thick stock; diluting it to 0.5% with fresh waster to feed the last stage of reverse cleaning. A fourth and final washing collected the thick stock in the dump tank and the filtrate went to sewer.

Overall, the laboratory trial was considered to be a success, revealing the reverse screen apparatus to be very efficient for wax washing. The final result produced a fiber that physically was very clean in appearance and was essentially free of wax residue. The following table provides the wax content, as measured, in terms of grams per liter and in terms of % by weight of the feed to the reverse screen and the accepts from the reverse screen. The test results show that only three stages of cleaning was necessary to provide a very low wax content, in which the feed to the first stage exceeded 36% wax by weight and the accepts from the third stage was less than 0.3% by weight. If the criteria of wax content was acceptability at 1% or less, then two stages of reverse cleaning, using the method described, would have been sufficient since the accepts at the second stage were less than 1% by weight wax content.

TABLE

|  |  | Wax Content | % by Wt |
|---|---|---|---|
| First Stage | Feed | 2.0g/L | 36.56 |
|  | Accepts | 2.4g/L | 6.38 |
| Second Stage | Feed | 0.5g/L | 9.98 |
|  | Accepts | 0.4g/L | 0.85 |
| Third Stage | Feed | 0.2g/L | 6.17 |
|  | Accepts | 0.1g/L | 0.28 |
| Fourth Stage | Feed | 0.2g/L | 6.38 |
|  | Accepts | 0.1g/L | 0.22 |

It will therefore be seen that this invention provides a useful method and apparatus for the substantial removal of conventional and untreated petroleum wax components from a waxed furnish which results in a beneficiation of the pulp and a removal of wax loading, which may begin as high as 50%, and which may be reduced to about 1% or less, thereby providing a furnish which may be conventionally used as a reclaimed product in the manufacture of brown paper and board.

While the methods herein described, and the forms of apparatus for carrying this method into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. The method of treating waxed fiber paper product having a high wax content substantially in excess of 1% by weight providing a paper board finish which has an acceptably small wax content, such as about 1% by weight or less, comprising the steps of pulping such waxed paper fiber product with added water at an elevated temperature in excess of the melting point of the wax forming a heated pulp suspension comprising a pulp fraction in an emulsion of water and molten wax, diluting said pulp suspension with heated dilution water to a low consistency of about 1% or less, apparatus having therein a screen and defining a high pressure screen inlet side and a low pressure screen outlet side and having perforations therein of a sufficiently small size as to prevent a major portion of the fibers in poised suspension from passing therethrough and extending from said high pressure inlet side to said low pressure outlet side and further having moving pressure impulse foils in close proximity to said high pressure inlet side, applying said low consistency suspension under pressure to said screen high pressure inlet side and simultaneously causing said foils to move along said screen inlet side at a rate sufficient to maintain fibers in said suspension in a fluidized state and prevent blocking of said screen perforations by said fibers, and extracting a major portion of such water and wax emulsion from said suspension through said screen perforations.

2. The method of claim 1 in which said separating step includes the application of said suspension serially to a plurality of such reverse pressure screening apparatus by applying dilution liquid so that the diluted suspension is applied to the reverse pressure screening apparatus in which said plurality of apparatuses are connected in series, the applying cleanest dilution liquid to the last of such apparatuses and applying the wax emulsion laden filtrate through said last of such apparatus and applying the wax emulsion laden filtrate through said last such apparatus as the dilution liquid to the immediately preceding reverse pressure screening apparatus in a countercurrent washing manner.

3. The method of claim 1 in which said low consistency suspension in said separating step is applied to the inside surface of a cylinder shaped screen and in which the perforations therein are holes in the order of about 0.004" to about 0.016" in diameter.

4. The method of claim 3 in which said impulse foils are moved at a rate of about 5,000 feet per minute along said screen inside surface.

5. A paper board finish made according to the method of claim 1.

6. The method of utilizing a waxed paper product, including OCC that has been impregnated with petroleum wax and providing a paper fiber finish which has a substantially reduced wax content suitable for making paperboard and carton material, comprising the steps of pulping said waxed paper product in a hydropulper at an elevated temperature in excess of the melting point of the wax at a consistency of about 8% to 12%, continuing said pulping until the paper product is defibered and the wax content is disassociated, thereby forming a pulp suspension comprising a pulp fraction in an emulsion of water and liquid wax, removing said pulp suspension substantially at said elevated temperature from said hydropulper and subjecting said suspension to cleaning to remove non-wax contaminants while maintaining said suspension substantially at said elevated temperature, and separating said pulp fraction from said water and wax emulsion fraction by diluting said suspension to a consistency of about 1% or less and applying said diluted suspension under pressure and at said elevated temperature to the inlet of a reverse pressure screening apparatus having a cylinder screen therein having an inlet side and an outlet side and having perforations therein leading from said inlet side to said outlet side of a sufficiently small size as to prevent a major portion of the paper fibers in the furnish from passing therethrough, and extracting a substantial portion of said wax emulsion fraction from said diluted suspension through said screen perforations leading from an inlet side to said outlet side of such screen and simultaneously passing impulse foils along said inlet side to maintain said diluted suspension in a constant fluidized condition at said inlet side and preventing the formation of a fiber mat on the inlet side of said screen, and extracting a thickened pulp suspension from said apparatus at said screen inlet side substantially free of said water and wax emulsion fraction thereby providing an enhanced furnish with an acceptably low wax content.

7. The method of claim 6 in which said separating step includes the application of said diluted suspension serially to a plurality of such reverse pressure screening apparatus by applying dilution water so that the suspension is applied at a consistency of about 0.5% to each said apparatus connected in series, and applying the cleanest dilution water to the last said pressure screening apparatus and applying the emulsion fraction extracted from said last apparatus as dilution water to an immediately preceding such apparatus in a countercurrent washing manner.

8. The method of claim 6 in which said pulping step is performed under conditions of elevated alkalinity of between about 9 and 11 pH to promote swelling of the paper fibers.

9. The method of reducing the wax content of a suspension of waste paper fibers in water in which said wax content substantially exceeds 1% by weight of the fiber content of the waste paper fibers to form an enhanced thickened paper pulp which has a substantially reduced wax content, comprising the steps of heating such suspension to an elevated temperature by at least 10° F. in excess of the melting temperature of said wax content and beating or agitating at said elevated temperature to promote the disassociation of the wax component from the fiber component and to form an emulsion of wax and water, adding sufficient heated water to said pulp suspension to provide a relatively low inlet consistency of about 1% or less, applying said low consistency suspension while maintaining said elevated temperature under pressure to the inlet of a reverse pressure screen having therein a screen cylinder with small openings in the form of holes of a size as to prevent a major part of the paper fibers from passing through such screen openings, causing a plurality of impulse members to move at high speed adjacent to the inlet surface of said screen cylinder to maintain said low consistency suspension in a fluidized condition at said screen inlet surface to prevent the formation of a fiber mat on said inlet surface, and separating said emulsion from said pulp fibers at said inlet surface by extracting said emulsion through said screen openings, and removing the resulting said thickened pulp fibers from said reduced pressure screen as an improved paper pulp with a substantially reduced wax content.

10. An improved paper pulp treated in accordance with the method of claim 9.

11. The method of treating waxed paper fiber product having a wax content of up to about 50% or more by weight of paper fiber providing an improved paper board finish which has an acceptably small wax content, of about 1% by weight or less, comprising the steps of pulping such waxed paper fiber product with added water at an elevated temperature at least 10° F. in excess of the melting point of the wax, continuing said pulping until such paper product is defibered, thereby forming a heated pulp suspension comprising a pulp fraction in an emulsion of water and molten wax, subjecting said heated pulp suspension to cleaning steps to remove therefrom primarily non-wax contaminants including unpulped clumps, heavy and lightweight contaminants while maintaining said suspension substantially at said elevated temperature, then separating said pulp fraction from said emulsion by filtering at said elevated temperature in reverse pressure screening apparatus having therein a perforated screen and defining a high pressure screen side and a low pressure screen side, applying said suspension under pressure to said high pressure side of said screening apparatus while maintaining said suspension in a constant fluidized state to prevent the formation of a fiber mat on the perforated screen high pressure side, and extracting a major portion of such water and molten wax emulsion from the suspension through perforations in such screen leading from said high pressure side to said low pressure side of a size sufficiently small as to prevent a major portion of the fibers of said pulp fracture from pressing therethrough to provide a thickened pulp fraction from which said major portion of water and molten wax emulsion has been extracted, and utilizing said thickened pulp fraction as fiber content in a board furnish.

12. Apparatus for producing a substantially wax-free paper pulp slurry comprising:
(a) a pressure vessel provided with an interior cavity, an inlet port communicating with said cavity, a first outlet port communicating with said cavity and a second outlet port communicating with said cavity;
(b) a screen provided with a multiplicity of perforations sized for blocking passage of a major portion of reclaimed paper fibers suspended in water while passing melted wax particles suspended in such a paper pulp slurry, and having an upstream side and a downstream side, said screen extending transversely across said cavity with said upstream side facing said inlet port and said first outlet port and said downstream side facing said second outlet port;
(c) a heated paper pulp slurry comprising reclaimed paper pulp fibers with particles of melted wax suspended therein, said paper pulp slurry flowing within said cavity between said inlet port and said upstream side of said screen;
(d) a plurality of rotating foils mounted for rotation in closely spaced relation to said screen upstream side maintaining reclaimed paper fibers in fluidized suspension in said slurry;
(e) a mixture of hot water and melted wax flowing from said downstream of said screen toward said second outlet port; and
(f) a substantially wax-free paper pulp slurry flowing from said upstream side of said screen toward said first outlet port.

13. The apparatus of claim 12 in which said screen perforations are holes between about 0.006" and 0.010" in diameter.

\* \* \* \* \*